Figure 2:
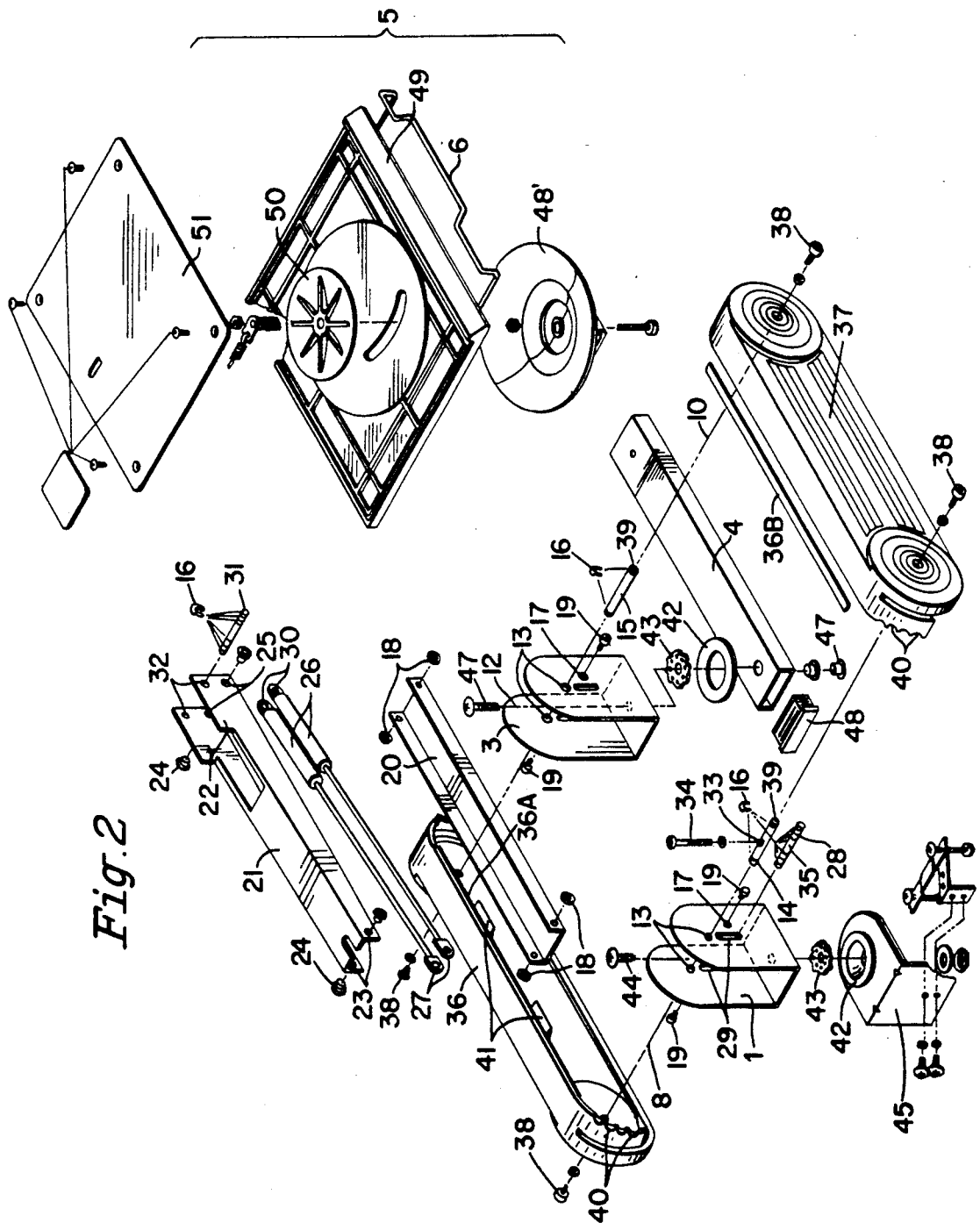

United States Patent [19]

Gates

[11] Patent Number: 5,123,621
[45] Date of Patent: Jun. 23, 1992

[54] SWIVEL ARM FOR A SUPPORTING PLATE, IN PARTICULAR A MONITOR SUPPORTING PLATE

[75] Inventor: Jeffrey L. Gates, Windsor, Calif.

[73] Assignee: First National Investments Limited, Ramsey, Isle of Man

[21] Appl. No.: 665,650

[22] Filed: Mar. 7, 1991

[30] Foreign Application Priority Data

Mar. 7, 1990 [EP] European Pat. Off. ......... 90104381

[51] Int. Cl.$^5$ ............................................. F16M 11/00
[52] U.S. Cl. ................................ 248/281.1; 248/183; 248/920
[58] Field of Search .................... 248/281.1, 278, 282, 248/283, 284, 276, 919, 920, 921, 922, 923, 183, 631

[56] References Cited

U.S. PATENT DOCUMENTS

| | | |
|---|---|---|
| 3,160,379 | 12/1964 | Gardella . |
| 3,436,046 | 4/1969 | Valeska ................. 248/284 |
| 4,635,894 | 1/1987 | Sammons . |
| 4,687,167 | 8/1987 | Skalka et al. ............... 248/183 X |
| 4,695,024 | 9/1987 | Haven . |
| 4,768,744 | 9/1988 | Leeds et al. ............... 248/284 X |
| 4,783,036 | 11/1988 | Vossoughi ............... 248/281.1 |
| 4,852,842 | 8/1989 | O'Neill ............... 248/281.1 |

FOREIGN PATENT DOCUMENTS 1491073 7/1969 Fed. Rep. of Germany .
0785363 10/1957 United Kingdom .

Primary Examiner—Ramon O. Ramirez
Attorney, Agent, or Firm—Stevens, Davis, Miller & Mosher

[57] ABSTRACT

There is indicated a three-dimensionally adjustable swivel arm for a support plate, particularly for a support plate for monitors, comprising a main support (1), a first arm section (2) with a pneumatic spring element to be swiveled around said main support (1) in a first axis (8), an intermediate support (3), at which the first arm section (2) is mounted in a manner that it can be swiveled around a second axis (10), and a second arm section (4), which is connected in swiveling manner with said intermediate support (3) and which carries a support plate (5). The swivel arm is characterized in that said penumatic spring element consists of two pneumatic springs, the receiving points of which, which face intermediate support (3), are arranged above the connection surface of the two swivel axes (8, 10) of first arm section (2).

20 Claims, 2 Drawing Sheets

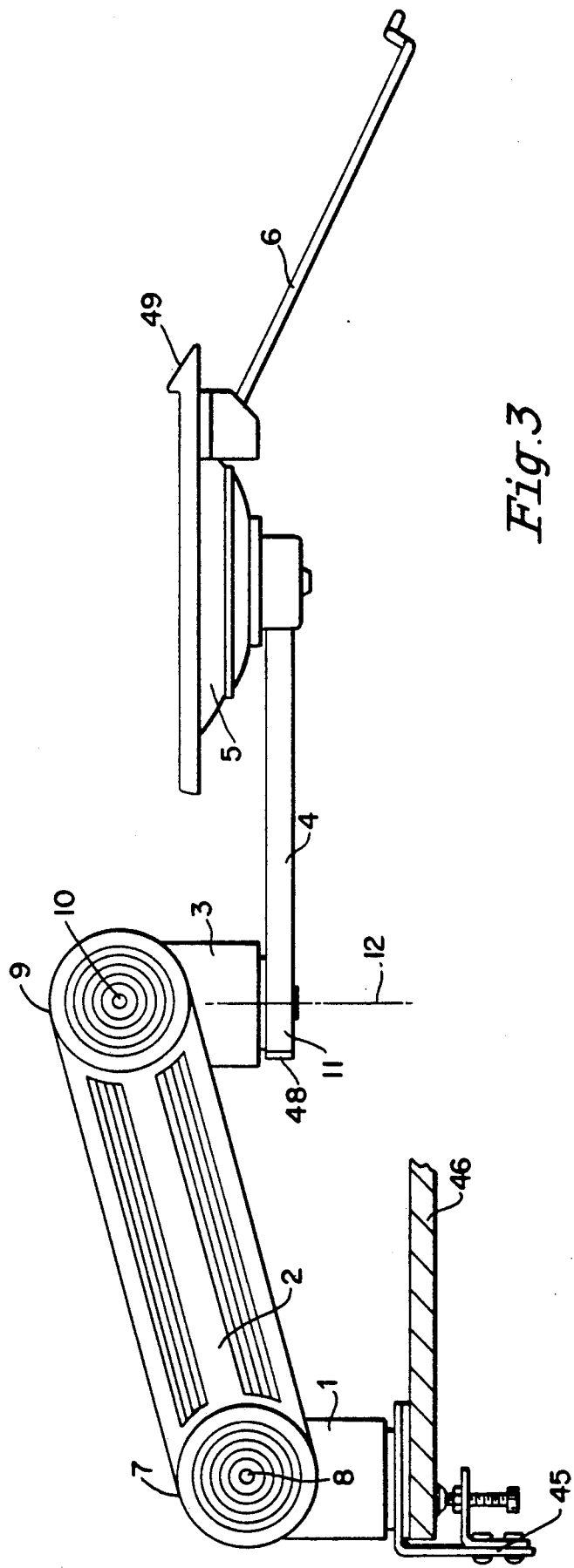
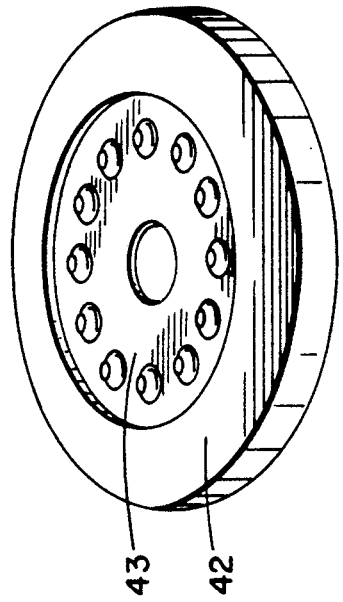

SWIVEL ARM FOR A SUPPORTING PLATE, IN PARTICULAR A MONITOR SUPPORTING PLATE

DESCRIPTION

The invention relates to a three-dimensionally adjustable swivel arm for a supporting plate, in particular for a monitor supporting plate.

This kind of swivel arms is known and already frequently used at workplaces which are equipped with monitors, keyboards and other computer devices, if any. On the supporting plate of such a swivel arm there is usually placed a monitor. At said supporting plate there is frequently provided in addition a shelf for the keyboard. Such a swivel arm with a supporting plate has the advantage that it can be mounted at a workplace temporarily or permanently and that the free working surface of the table is not restricted by equipment, like monitor, keyboard or telephone which are placed on the supporting plate. According to requirements the equipment placed on the supporting plate can easily be drawn near by the user and if not used it can be swung out of the way so far that there is no longer any impairment of space.

There are known different constructions of three-dimensionally adjustable swivel arms for a supporting plate, in particular for a supporting plate for monitors. The substantial features of a specific embodiment of such a common swivel arm are the following:

a. A main support at which a first arm section is fixed with its one end to be swiveled around a first horizontal axis;

b. a pneumatic element disposed at a first arm section, the receiving points of which are located in the vicinity of the ends of the first arm section;

c. an intermediate support at which the other end of the first arm section is mounted in a manner that it can be swiveled around a second horizontal axis with respect to the intermediate support; and d. a second arm section which with its one end is mounted at the intermediate support in a manner that it can be swiveled around a first vertical axis and which at its other end carries the supporting plate.

A thus designed swivel arm, however, still has disadvantages. It is true that its vertical movement is supported or decelerated by means of the pneumatic spring interacting with the first arm section, so that the equipment placed on the supporting plate can be swiveled to the desired position more easily and safely than this would be the case without the pneumatic spring. It turned out, however, that a rather large pneumatic spring would be necessary which additionally would have to exhibit a high initial tension in the first supporting arm. This does not only increase the costs of production of the pneumatic spring and the parts of the swiveling arm receiving the initial tension, but also comprises a large safety risk since pneumatic springs with high internal pressure can burst.

It is a further disadvantage of this known type of swivel arm that the pivot bearing which is e.g. attached to a tabletop and carries the mentioned main support of the swivel arm, frequently exerts a too low braking effect during the horizontal swivel movement of the swivel arm so that it moves away from the user's reach. If, however, for this purpose said bearing is made of a synthetic material with a correspondingly larger friction coefficient, this bearing material will wear out in the course of time so that the main support of the swivel arm will incline from the vertical in correspondence with the weight on the supporting plate and lose its stability. The same is true for the pivot bearing located between the above mentioned intermediate support and the second arm section.

It is therefore the problem of the invention to improve the above described embodiment of a known swivel arm to the effect that the production expenditure of the pneumatic spring and the safety risk are reduced and that the stability of the swivel arm bearings mainly loaded in vertical direction is large even after a long period of use.

The invention solves this problem by means of a three-dimensionally adjustable swivel arm having the initially mentioned features a to d, which swivel arm is characterized in that the pneumatic spring element consists of at least two pneumatic springs acting in parallel, the receiving points of which, which face the intermediate support, are located between the first and the second horizontal swivel axis of the first arm section.

With this it is achieved that for the manufacture of such swivel arms pneumatic springs of much smaller dimension with much lower internal pressure and with a considerably lower initial tension can be used. This does not only save material but also reduces considerably the risk of springs to burst. The production costs for the pneumatic springs are considerably reduced by this as well. By using a larger number of pneumatic springs per swivel arm than with the known swivel arm the production costs per pneumatic spring are reduced to such an extent that the costs for two pneumatic springs used according to the invention, which are of smaller dimension, are less than the costs for the single and stronger pneumatic spring used for the known swivel arm.

The swivel arm according to the invention can also do with a lower spring tension of the pneumatic spring for the reason that this spring is inclined with respect to the connection surface between the first and the second horizontal swivel axis. In the known swivel arm the pneumatic spring is substantially positioned in said connection surface.

According to a preferred embodiment of the swivel arm according to the invention also the receiving points of the pneumatic springs facing the main support are arranged below the connection surface between the first and the second horizontal swivel axis of the first arm section. Due to this the direction of action of the pneumatic springs is in a still steeper angle with respect to said two swivel axes, and the required spring tension of the pneumatic springs is reduced even further.

Even more preferred is an embodiment in which the receiving points of the pneumatic springs facing the main support are arranged substantially vertically below the first horizontal swivel axis of the first arm section and the receiving points of the pneumatic springs facing the intermediate support are arranged substantially vertically above the second horizontal swivel axis of the first arm section.

It turned out to be expedient for the swivel arm to comprise an adjusting mechanism for adjusting the initial tension of the pneumatic springs. Thus the degree of the influence of the vertical movement of the first arm section by the pneumatic springs can be varied and e.g. be adapted to the weight exerted on the monitor supporting plate.

It is very favorable if the first arm section comprises two semimonocoque-shaped covers designed integrally in the two side views of the arm section. With regard to the covers of the known swivel arm they provide increased security since during the vertical movement of the first arm section there occurs no scissors-like movement of cover elements.

It is of advantage when the covers for receiving electric cables have recesses at their ends and internal supporting elements. Then, for instance, cables from monitor and keyboard, which must be carried along with the swiveling motion of the swivel arm, can be collected partly invisible, and do not impede the movement of the swivel arm.

Preferably the main support is pivoted on an thrust bearing, which substantially consists of an annular disc and a ball bearing in the inner space of the annular disc. Thereby it is particularly preferred that the thickness of the annular disc is dimensioned such that it slightly exceeds the diameter of the balls of the ball bearing. By means of the annular disc which consists of any known material, the rotating movement of the main support in the thrust bearing achieves a desired braking effect, thus avoiding that the swivel arm swivels too far due to a slight lateral impact. If, after some time of use, the annular disc becomes thinner within the region of utmost stress, which is inevitabe, and thus the thrust bearing is apt to wear out and the main support starts to incline, forces which would normally increase these effects are balanced by the ball bearing.

The same advantage is also achieved in another area of the swivel arm, namely when the joint formed between the intermediate support and the second arm section comprises a thrust bearing of said above mentioned kind.

By way of example the invention is explained in the following by means of an embodiment schematically illustrated in the drawings.

There is shown in

FIG. 1 a side view of the swivel arm with monitor supporting plate and keyboard rest;

FIG. 2 an exploded view of the swivel arm with monitor supporting plate according to FIG. 1; and FIG. 3 a complex thrust bearing according to FIG. 2 in an enlarged view.

According to FIG. 1 the external part of the swivel arm substantially comprises a main support 1, a first arm section 2, an intermediate support 3 and a second arm section 4. At the latter there is mounted a monitor supporting plate 5 with a keyboard rest.

The one end 7 of the first arm section 2 is fixed at the main support 1 in a manner that it can swivel around a first horizontal axis 8. The other end 9 of the first arm section 2 is fixed to intermediate support 3 in a manner that it can swivel around a second horizontal axis 10.

The one end 11 of the second arm section 4 is fixed to the bottom side of intermediate support 3 in a manner that it can swivel around a vertical axis 12.

According to FIG. 2 main support 1 and intermediate support 3 are designed as U-beams which are open to the top, the leg ends of which are designed approximately semicircular. In bores 13 of main support 1 and intermediate support 3 shafts 14, 15 are journalled, which correspond to the horizontal swivel axis 8, 10 of first arm section 2. Shafts 14, 15 are secured by safety rings 16 in bores 13.

By means of bores 17, slide rings 18 and screws 19 a first U-profile iron open to the top is rotatably connected to each of main support 1 and intermediate support 3.

A second U-profile iron 21 open to the bottom, with parallel legs 22 elongated at one end, is pivoted on the one hand by means of bores 23 and bearing bushings 24 made of metal (with an interior coating of polytetrafluoroethylene) on shaft 14 in main support 1, and on the other hand by means of bores 25 (in parallel legs 22) and also bearing bushings 24 on shaft 15 in the intermediate support 3.

Two parallel pneumatic springs 26 are movably pivoted with their receiving points 27 facing main support 1 on a shaft 28, which is disposed in vertical oblong holes 29 of main support 1. Thus these receiving points 27 of pneumatic springs 26 in main support 1 are located below the first horizontal swivel axis 8 of the first arm section 2.

Receiving points 30 of pneumatic springs 26 facing intermediate support 3 are pivoted on a shaft 31, which is disposed in bores 32 in the parallel legs 22 of the second U-profile iron 21. In the vicinity of intermediate support 3 receiving points 30 of pneumatic springs 26 are located above the second horizontal swivel axis 10 of the first arm section 2.

Shafts 28, 31 for receiving points 27, 30 of pneumatic springs 26 are secured in the pertinent bores 29, 32 by safety rings 16. The same is correspondingly true for the eye-shaped receiving points 27, 30 of pneumatic springs 26 on shafts 28, 31.

In its center shaft 14 for the second U-profile iron 21 has a vertical radial bore. Through said bore an adjusting screw 34 is passed which engages a corresponding radial thread in the shaft 28 positioned underneath. With this it is possible to change in oblong hole 29 the distance of shaft 28 from swivel axis 8 of arm section 2. Such a change also means an alteration of the distance between the receiving points 27, 30 of pneumatic springs 26. Thus there is provided an advantageous adjusting mechanism for the inclination angle or the initial tension of pneumatic springs 26 in arm section 2, respectively.

The first arm section 2 comprises two semimonocoque-shaped elongated covers 36, 37 designed integrally in the two lateral views of this arm section. Each of said covers 36, 37 is mounted in the first and in the second horizontal swivel axis 8, 10, respectively, by means of two cover screws 38 at shafts 14, 15, for which purpose said shafts are provided with respective axial threads 39. At their rounded ends covers 36, 37 are provided over a circumferential section of their inner edges with a plurality of opposing semimonocoquelike recesses 40. Thus approximately annular openings are formed at the offset covers 36, 37 for passing through electric cables. From the interior side of cover 36 two ribs extend, at equal distance, from the upper edge of the cover, which ribs, serving as supporting elements 41, together with the upper wall of cover 36, form a kind of cable channel for the electric cables in the interior of arm section 2,.

For reinforcement and mutual fastening there is provided in each upper edge of cover 36, 37, respectively, an oblong hole 36 A in which a reinforcing strip 36 B made of stiff material is inserted.

Main support 1 and intermediate support 3 each are pivoted on a thrust bearing, which substantially consists of an annular disc 42 and a ball bearing 43 in the internal free space of annular disc 42. FIG. 3 shows the composite bearing. The thickness of annular disc 42 slightly exceeds the diameter of the balls of ball bearing 43.

By means of a screw 44 and via thrust bearing 42, 43 main support 1 is connected to an angle plate 45, which is equipped in usual manner with clamping screws and other means for mounting angle plate 45 to a tabletop 46 (see FIG. 1).

In axis 12 and via a thrust bearing 42, 43 the bottom of intermediate support 3 is pivoted via screws 47 at the end 11 of the second arm section 4. The latter is designed as a square tube and closed with a plug 48 at said end 11.

At the other end of second arm section 4 the monitor supporting plate 5 is screwed. Said plate 5 substantially consists of, from bottom to top, a round base plate 48', a square main plate 49, a round intermediate plate 50 and a square cover plate 51. At the bottom of main plate 49 there is fixed a U-clamp 6 which can be drawn out sideways, which in drawn out state (see FIG. 1) serves as a keyboard rest 6. U-clamp 6 cannot only be drawn out, but in this state can also be lowered, if desired, in order to allow the user of the keyboard placed thereupon to assume a comfortable position of arm and hand.

The individual parts of monitor supporting plate 5 are designed in common manner and supplemented by additional constructional elements such that this plate can be rotated around its middle axis and that it can be inclined with respect to the horizontal line.

When the swivel arm is used the pneumatic springs, during an upward or downward movement of the first arm section 2, are extended or contracted and thereby influence the expenditure of energy required in dependency of their adjusted initial tension.

I claim:

1. Three-dimensionally adjustable swivel arm for a supporting plate, in particular a monitor supporting plate, comprising
   a main support (1) at which a first arm section (2) is mounted in a manner that its one end (7) can swivel about a first horizontal axis (8),
   a pneumatic spring element, the receiving points of which are located in the region of the end parts (7, 9) of first arm section (2),
   an intermediate support (3), at which the other end (9) of the first arm section (2) is mounted in a manner that it can swivel around a second horizontal axis (10) with respect to the intermediate support (3), and
   a second arm section (4) which is mounted with its one end at intermediate support (3) in a manner that it can swivel around a vertical axis (12) and the other end of which arm section carries supporting plate (5).

2. The swivel arm according to claim 1, wherein said receiving points (27) of pneumatic springs (26) facing main support (1) are disposed below the connecting surface of the first and the second horizontal swivel axis (8, 10), respectively, of the first arm section (2).

3. The swivel arm according to claim 1, wherein said receiving points (27) of pneumatic springs (26) facing main support (1) are arranged substantially vertically below the first horizontal swivel axis (8) of first arm section (2) and said receiving points (30) of pneumatic springs (26) facing intermediate support (3) are arranged substantially vertically above the second horizontal swivel axis (10) of the first arm section (2).

4. The swivel arm according to claim 1 including an adjusting mechanism (34, 35) for adjusting the initial tension in the pneumatic springs (26).

5. The swivel arm according to claim 1, wherein said first arm section (2) comprises two semimonocoque-shaped covers (36, 37) designed integrally at the two side views of arm section (2).

6. The swivel arm according to claim 5, wherein for receiving electric cables, the covers (36, 37) comprise recesses (40) at their ends and interior supporting elements (41).

7. The swivel arm according to claim 1, wherein said main support (1) is pivoted on a thrust bearing which substantially consists of an annular disc (42) and a ball bearing (43) within the interior free space of the annular disc (42).

8. The swivel arm according to claim 7, wherein said annular disc (42) has a thickness slightly exceeding the diameter of the balls of the ball bearing (43).

9. The swivel arm according to claim 1, wherein said second arm section (4) is mounted to said intermediate support (3) by a thrust bearing.

10. The swivel arm according to claim 2, herein said receiving points (27) of pneumatic springs (26) facing main support (1) are arranged substantially vertically below the first horizontal swivel axis (8) of first arm section (2) and said receiving points (30) of pneumatic springs (26) facing intermediate support (3) are arranged substantially vertically above the second horizontal swivel axis (10) of the first arm section (2).

11. The swivel arm according to claim 1, including an adjusting mechanism (34, 35) for adjusting the initial tension in the pneumatic springs (26).

12. The swivel arm according to claim 3, including an adjusting mechanism (34, 35) for adjusting the initial tension in the pneumatic springs (26).

13. The swivel arm according to claim 10, including an adjusting mechanism (34, 35) for adjusting the initial tension in the pneumatic springs (26).

14. The swivel arm according to claim 2, wherein said first arm section (2) comprises two semimonocoque-shaped covers (36, 37) designed integrally at the two side views of arm section (2).

15. The swivel arm according to claim 3, wherein said first arm section (2) comprises two semimonocoque-shaped covers (36, 37) designed integrally at the two side views of arm section (2).

16. The swivel arm according to claim 10, wherein said first arm section (2) comprises two semimonocoque-shaped covers (36, 37) designed integrally at the two side views of arm section (2).

17. The swivel arm according to claim 4, wherein said first arm section (2) comprises two semimonocoque-shaped covers (36, 37) designed integrally at the two side views of arm section (2).

18. The swivel arm according to claim 11, wherein said first arm section (2) comprises two semimonocoque-shaped covers (36, 37) designed integrally at the two side views of arm section (2).

19. The swivel arm according to claim 13, wherein said first arm section (2) comprises two semimonocoque-shaped covers (36, 37) designed integrally at the two side views of arm section (2).

20. The swivel arm according to claim 13, wherein said first arm section (2) comprises two semimonocoque-shaped covers (36, 37) designed integrally at the two side views of arm section (2).

\* \* \* \* \*